US009555767B2

(12) United States Patent
Gentner et al.

(10) Patent No.: US 9,555,767 B2
(45) Date of Patent: Jan. 31, 2017

(54) DRIVING WHEEL FOR SEATBELT TENSIONERS AND SEATBELT TENSIONERS FOR A SEATBELT SYSTEM

(75) Inventors: Bernd Gentner, Ellwangen/Pfahlheim (DE); Thomas Moedinger, Alfdorf (DE); Andreas Pregitzer, Ellenberg/Krassbronn (DE)

(73) Assignee: TRW Automotive GmbH (DE)

( * ) Notice: Subject to any disclaimer, the term of this patent is extended or adjusted under 35 U.S.C. 154(b) by 227 days.

(21) Appl. No.: 13/885,181

(22) PCT Filed: Aug. 11, 2011

(86) PCT No.: PCT/EP2011/004026
§ 371 (c)(1),
(2), (4) Date: Jun. 7, 2013

(87) PCT Pub. No.: WO2012/065656
PCT Pub. Date: May 24, 2012

(65) Prior Publication Data
US 2014/0145020 A1 May 29, 2014

(30) Foreign Application Priority Data

Nov. 17, 2010 (DE) .................. 10 2010 051 419

(51) Int. Cl.
*F16H 55/00* (2006.01)
*B60R 22/46* (2006.01)
*F16H 55/17* (2006.01)

(52) U.S. Cl.
CPC .............. *B60R 22/46* (2013.01); *F16H 55/17* (2013.01); *B60R 2022/4647* (2013.01)

(58) Field of Classification Search
CPC ... F16H 55/00; B60R 22/46; B60R 2022/4647
USPC ......................................... 242/374
See application file for complete search history.

(56) References Cited

U.S. PATENT DOCUMENTS

| 4,444,010 A | 4/1984 | Bendler |
| 4,653,340 A * | 3/1987 | LaBate ........................ 74/462 |
| 2006/0157607 A1* | 7/2006 | Kohlndorfer et al. ........ 242/374 |
| 2010/0095792 A1* | 4/2010 | Stanovskoy et al. ........... 74/414 |
| 2011/0079098 A1* | 4/2011 | Nowicki ........................ 74/411 |

FOREIGN PATENT DOCUMENTS

| DE | 2931164 | 2/1981 |
| DE | 202006014487 | 2/2007 |
| DE | 102006031359 | 10/2007 |
| GB | 2019197 | 10/1979 |

* cited by examiner

*Primary Examiner* — Sang Kim
(74) *Attorney, Agent, or Firm* — Tarolli, Sundheim, Covell & Tummino LLP

(57) ABSTRACT

A drive wheel for a belt tensioner is adapted to be coupled to a belt reel and includes an external tooth system including plural teeth distributed along the circumference. The teeth are inclined in a first circumferential direction and/or the teeth have at least one end face facing away from the central axis of the drive wheel and being inclined in a first circumferential direction and/or the clearances between neighboring teeth are not symmetrical with respect to planes defined by radial and axial directions. The teeth have no symmetry with respect to planes extending tangentially relative to the circumferential direction.

14 Claims, 4 Drawing Sheets

DRIVING WHEEL FOR SEATBELT TENSIONERS AND SEATBELT TENSIONERS FOR A SEATBELT SYSTEM

RELATED APPLICATIONS

This application corresponds to PCT/EP2011/004026, filed Aug. 11, 2011, which claims the benefit of German Application No. 10 2010 051 419.5, filed Nov. 17, 2010, the subject matter of which are incorporated herein by reference in their entirety.

BACKGROUND OF THE INVENTION

The invention relates to a drive wheel for a belt tensioner. The invention further relates to a belt tensioner for a seatbelt system comprising such drive wheel.

From DE 10 2006 031 359 A1 a belt tensioner for a seatbelt system is known comprising a drive unit and a force transmission element which upon activation of the drive unit acts on a pivoted drive wheel coupled or adapted to be coupled to the axle of a belt retractor. The drive wheel can be either a gearwheel or an impeller wheel. The force transmission element consists of a substantially deformable material so that a damped adjustment of the force transmission element occurs at the drive wheel. The problem of tooth-on-tooth occurring in a non-resilient toothed rack as force transmission element can be avoided in this way.

SUMMARY OF THE INVENTION

It is the object of the invention to further optimize the torque transmission between the force transmission element and the drive wheel in such type of belt tensioner so as to obtain maximum feed.

This object is achieved by a drive wheel comprising the features of the present invention. Advantageous and expedient configurations of the drive wheel according to the invention and of the belt tensioner according to the invention are described herein.

The drive wheel for a belt tensioner according to the invention is adapted to be coupled to a belt reel and comprises an external tooth system having plural teeth distributed along the circumference. The teeth are inclined in a first circumferential direction and/or the teeth have at least one end face facing away from the central axis of the drive wheel and being inclined in a first circumferential direction, and/or the clearances between neighboring teeth are not symmetrical with respect to planes defined by radial and axial directions. Moreover, the teeth according to the invention exhibit no symmetry with respect to planes extending tangentially to the circumferential direction.

In accordance with the invention, by "an external tooth system having plural teeth distributed along the circumference" also vanes or blades of an impeller wheel are to be meant.

The invention is based on the finding that the shape of the teeth of the drive wheel substantially influences the efficiency when converting the movement of the force transmission element (substantially linear at the time of contact) to a rotation of the drive wheel. It has turned out that a drive wheel having a shaping of the teeth according to the invention permits a definitely improved transmission of torque compared to a drive wheel having a classical external tooth system, especially when using a non-toothed force transmission element consisting of substantially deformable material.

In general, the drive output and the drive behavior of the tensioner can be adapted to different requirements within the scope of the invention by appropriately selecting the tooth shape, also with respect to the case of a blocked drive wheel. In particular regarding the concrete tooth shape, the tooth angle, the tooth crest angle, the depth of penetration into the force transmission element, the chip space, the crest radius, the drive wheel diameter, the tooth height and the shape of the tooth surface, within the criteria given according to the invention a design tolerance is provided by which the drive output and the drive behavior of the belt tensioner can be specifically influenced.

The drive wheel according to the invention moreover has the advantage that the material abrasion ("scraping") is minimized or completely avoided both on the side of the drive wheel and on the side of the force transmission element. Thus, on the one hand particles are prevented from detaching and, on the other hand, a reduction of the efficiency is counteracted.

In accordance with a further development of the invention, the drive wheel includes plural partial drive wheels axially arranged in series at least one of which satisfies at least one of the afore-mentioned combinations of criteria according to the invention. In this way even more options of variations are resulting for the design of the drive wheel so that an even more individual adaptation to given requirements is possible. The partial drive wheels can be manufactured inexpensively as punched parts.

Especially the partial drive wheels can be staggered so that the effective number of the teeth absorbing the torque is increased.

It is another possibility of influencing the adjustment of the force transmission element to design the external tooth system as helical gearing at least in portions.

Finally the teeth of the external tooth system can also be twisted about radial axes relative to the remaining drive wheel.

Independently of the concrete shape of the teeth according to the invention the drive wheel can be formed in one part or integrally with a belt retractor axle, i.e. the advantages of the invention can be used without restriction even in such embodiment that cuts down on components.

The invention also provides a belt tensioner for a seatbelt system comprising a force transmission element and a means for driving the force transmission element. The belt tensioner further comprises a pivoted drive wheel according to the invention having an external tooth system on which the force transmission element acts upon activation of the drive means so as to rotate the drive wheel.

The advantages of the invention are especially emphasized when using a force transmission element preferably integrally formed of a solid substantially deformable material. By a substantially deformable material a material is understood that is macroscopically deformed, for example when contacting the drive wheel. Examples hereof are EPDM materials of various Shore hardness (70-95 Shore), rubber, natural rubber or (soft) thermoplastic materials (polyamides). Also an ideal plastic compound such as clay or putty with or without a hose-like sheathing is taken into account. Deformations or material abrasions within the microscopic range as they occur when a common toothed rack contacts a gearwheel or separation of fractions of the force transmission element (breaking, shearing etc.) are not meant in this context.

A larger contact surface and thus better torque transmission are resulting from the fact that the force transmission element drives the drive wheel in a second circumferential direction opposite to the first circumferential direction.

BRIEF DESCRIPTION OF THE DRAWINGS

Further features and advantages of the invention are resulting from the subsequent description and the enclosed drawings which are referred to, showing in.

each of the FIGS. 5a, 5b to 10a, 10b an axial or perspective view of further embodiments of the drive wheel according to the invention.

DESCRIPTION OF EXEMPLARY EMBODIMENTS

Figure 1:
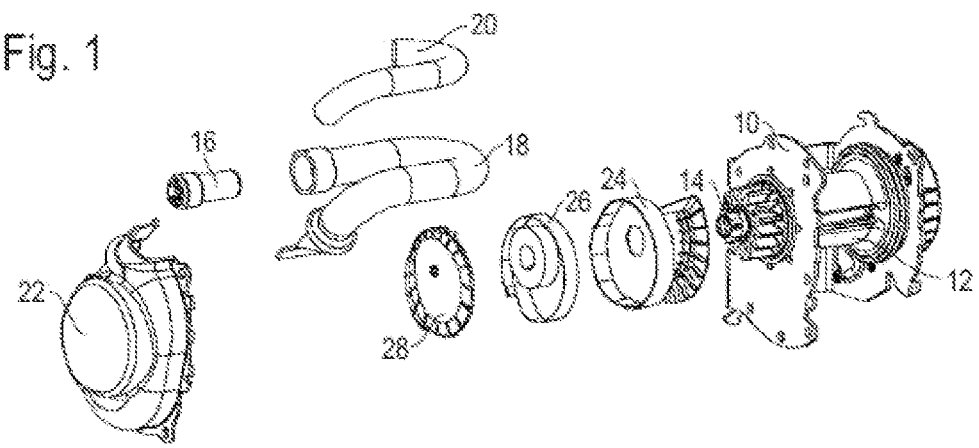
FIG. 1 an exploded view of a belt retractor comprising a belt tensioner according to the invention.
Figure 2:
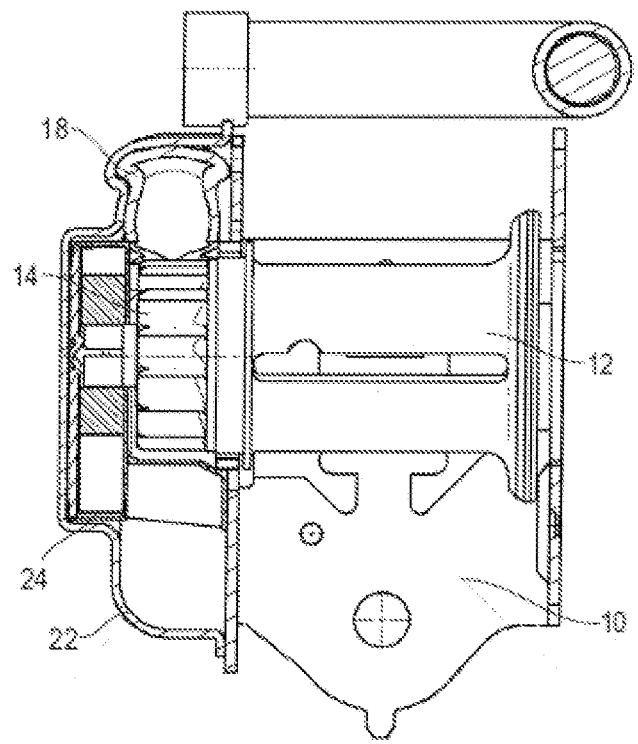
FIG. 2 a sectional view of the assembled belt retractor.

In FIG. 1 the substantial components of a belt retractor comprising a pyrotechnically driven belt tensioner are shown. In FIG. 2 the belt retractor is illustrated in the assembled state.

A belt reel 12 onto which the belt strap can be wound or from which the belt strap can be withdrawn is pivoted in a retractor frame 10. A drive wheel 14 having an external tooth system is pivoted onto the frame 10. The drive wheel 14 is coupled either permanently to the axle (belt reel 12) of the belt retractor or can selectively be coupled to the same. In the former case the drive wheel 14 can be formed in one part or integrally with the belt retractor axle.

The belt tensioner of the belt retractor further has a pyrotechnical drive unit including an igniter 16 and a force transmission element 20 disposed in a tensioner tube 18 and adapted to be driven by the drive unit. The force transmission element 20 is preferably integrally formed of a solid substantially deformable material. The components of the belt tensioner are at least partly accommodated in a tensioner casing 22 fixed to the retractor frame 10.

Furthermore a stop disc 24, a helical spring 26 disposed therein and a cover 28 are attached to the drive wheel 14. These components form a spring side of the belt retractor, as it is called, which is not important to the function of the belt tensioner, however.

Figure 3:
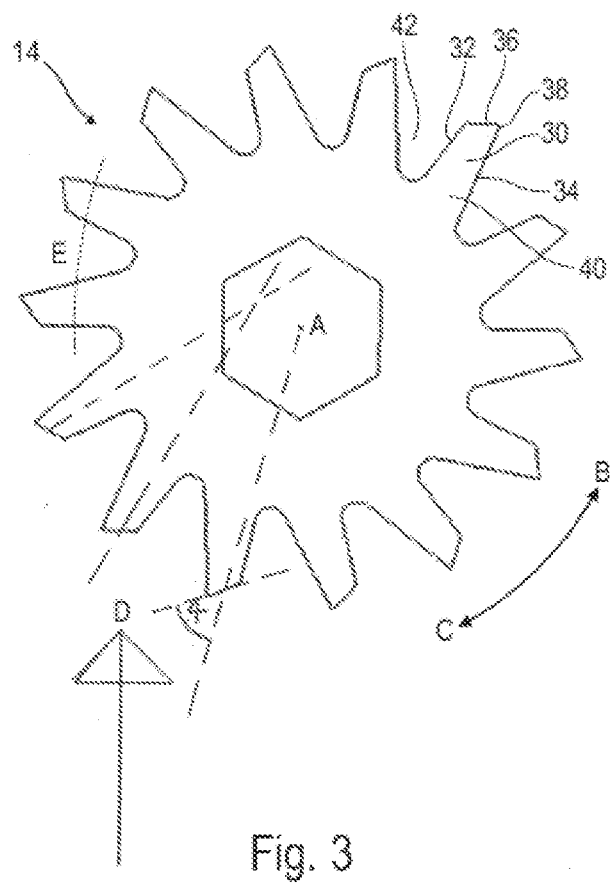
FIG. 3 an axial view of a drive wheel according to the invention.
Figure 4:
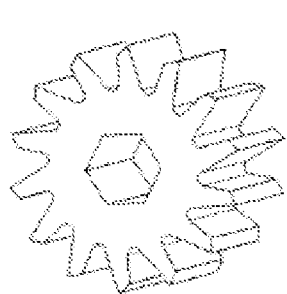
FIG. 4 a perspective view of the drive wheel of FIG. 3.
Figure 5A:
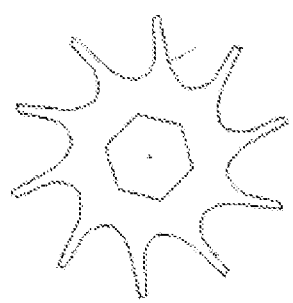
Figure 5B:
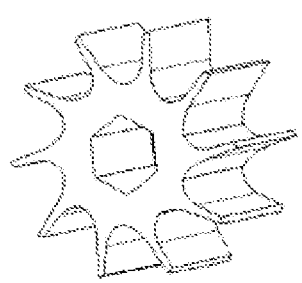
Figure 6A:
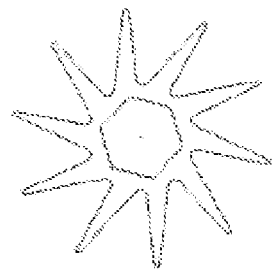
Figure 6B:
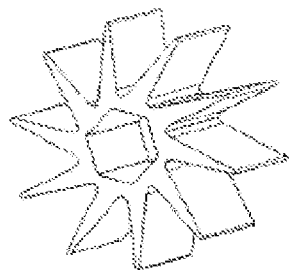
Figure 7A:
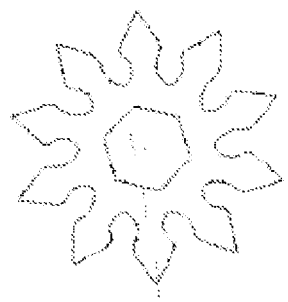
Figure 7B:
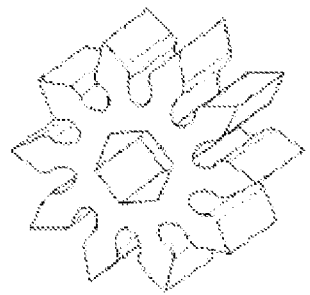
Figure 8A:
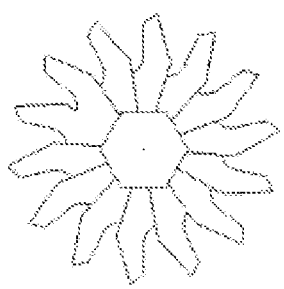
Figure 8B:
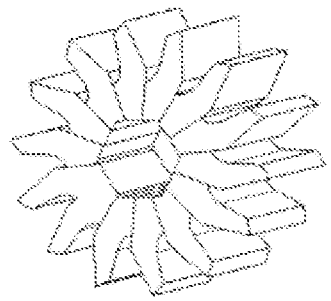
Figure 9A:
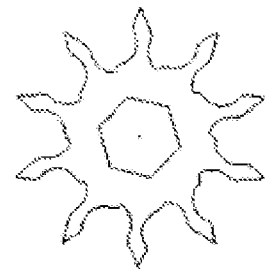
Figure 9B:
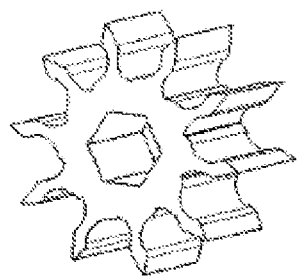
Figure 10A:
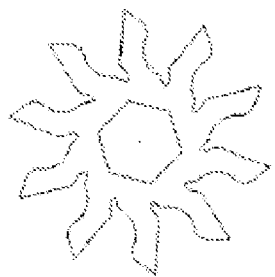
Figure 10B:
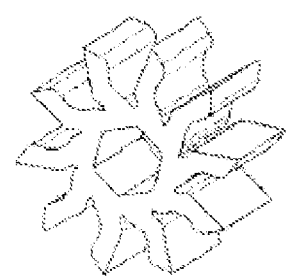

In FIG. 3 an embodiment of the drive wheel 14 is shown. The drive wheel 14 has a central axis A about which it is rotatable in the mounted state of the belt tensioner. Accordingly, hereinafter axial directions mean directions along the central axis A, radial directions mean directions along a radius starting from the central axis A and circumferential directions mean directions in parallel to the direction of rotation of the drive wheel 14.

The drive wheel 14 includes an external tooth system having a plurality of teeth 30 distributed along the circumference. The teeth 30 can be distributed, as shown in FIG. 3, evenly or else unevenly.

According to a first criterion, the teeth 30 are inclined in a first circumferential direction B, i.e. either both flanks 32, 34 of a tooth 30 (or substantial portions of the flanks 32, 34) are inclined in the circumferential direction B or either of the flanks 32, 34 (or a substantial portion of said flank) is inclined more strongly in the first circumferential direction B than the other flank (or a substantial portion of said flank) in the opposite circumferential direction C. The central lines of the teeth do not intersect the central axis of the drive wheel.

According to a second criterion, the end faces 36 of the teeth 30 are inclined in the first circumferential direction B, i.e. starting from the crest 38 of a tooth 36 (the point of the tooth 30 that is most distant from the central axis A) the end face 36 declines in the first circumferential direction B toward the basis 40 of the tooth 30 as shown in FIG. 3 by the angle α which is smaller than 90°. The end faces 36 of the teeth 36 thus are not machined either in a circular or tangential manner or else symmetrically with respect to planes defined by radial and axial directions.

In accordance with a third criterion, the clearances 42 between two neighboring teeth 30 are not symmetrical with respect to planes defined by radial and axial directions.

In accordance with a fourth criterion, the teeth 30 show no symmetry with respect to planes extending tangentially relative to a circumferential direction. In FIG. 3 such plane E is exemplified.

In the mounted state of the belt tensioner the drive wheel 14 is arranged so that the force transmission element moved in a direction D drives the drive wheel 14 in the second circumferential direction C. Thus a comparatively large contact surface presents itself to the impacting force transmission element entailing an improved torque transmission.

The FIGS. 5a, 5b to 10a, 10b show another six embodiments that satisfy the first and/or the second and/or the third and the fourth of the afore-mentioned criteria.

Figure 11A:
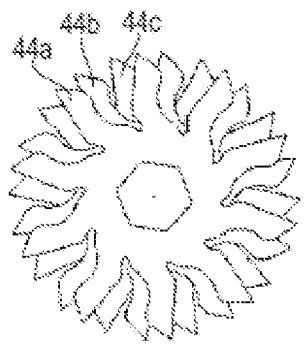
FIGS. 11a, 11b an axial or perspective view of a different embodiment of the drive wheel according to the invention.
Figure 11B:
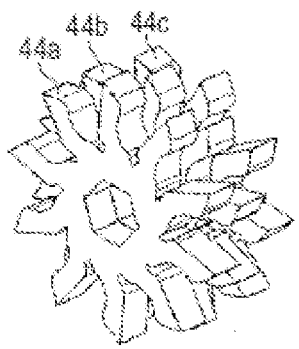

In FIGS. 11a and 11b an example of an embodiment is shown in which the drive wheel 14 consists of plural parts axially arranged in series. Each part per se constitutes a partial drive wheel 44a, 44b or 44c. At least one of the partial drive wheels 44a, 44b, 44c, preferably all partial drive wheels 44a, 44b, 44c satisfies or satisfy the first and/or the second and/or the third and the fourth of the afore-mentioned criteria. The partial drive wheels 44a, 44b, 44c are staggered. The partial drive wheels 44a, 44b, 44c can be manufactured as punched parts.

In accordance with a further embodiment (not shown) the external tooth system of the drive wheel 14 is in the form of a helical gearing at least in portions. Also twisting of the teeth 30 about radial axes relative to the remaining drive wheel 14 is possible. In any case, however, the first and/or the second and/or the third and the fourth of the afore-mentioned criteria is/are satisfied.

The invention claimed is:

1. A drive wheel (14) adapted to be coupled to a belt reel (12) for a belt tensioner comprising an external tooth system including plural teeth (30) distributed along the circumference, wherein the teeth (30) are inclined in a first circumferential direction (B), each of the teeth having a first flank and a second flank, a substantial portion of both the first flank and the second flank being inclined in the first circumferential direction, or a substantial portion of one of the first flank and the second flank being inclined more strongly in the first circumferential direction than a substantial portion of one other of the first flank and the second flank in a second circumferential direction opposite the first circumferential direction, and wherein the teeth each have a central line, the central lines of the teeth intersecting at points spaced apart from a central axis of the drive wheel.

2. The drive wheel (14) according to claim 1, wherein the drive wheel (14) comprises plural partial drive wheels (44a, 44b, 44c) axially arranged in series.

3. The drive wheel (14) according to claim 2, wherein the partial drive wheels (44a, 44b, 44c) are staggered.

4. The drive wheel (14) according to claim 1, wherein the external tooth system is formed as helical gearing at least in portions.

5. The drive wheel (14) according to claim 1, wherein at least some of the teeth (30) are twisted about radial axes relative to the remaining drive wheel (14).

6. The drive wheel (14) according to claim 1, wherein the drive wheel (14) is formed in one part or integrally with a belt retractor axle.

7. The drive wheel according to claim 1, wherein the teeth have at least one end facing away from the central axis of the drive wheel and being inclined in the first circumferential direction.

8. The drive wheel according to claim 1, wherein clearances between neighboring teeth are not symmetrical with respect to planes defined by radial and axial directions.

9. A belt tensioner for a seatbelt system, comprising a force transmission element (20) and means for driving the force transmission element,
- a drive wheel adapted to be coupled to a belt reel of the belt tensioner comprising an external tooth system including plural teeth distributed along the circumference, wherein
- the teeth are inclined in a first circumferential direction, each of the teeth having a first flank and a second flank, a substantial portion of both the first flank and the second flank being inclined in the first circumferential direction, or a substantial portion of one of the first flank and the second flank being inclined more strongly in the first circumferential direction than a substantial portion of one other of the first flank and the second flank in a second circumferential direction opposite the first circumferential direction,
- and wherein the teeth each have a central line, the central lines of the teeth intersecting at points spaced apart from a central axis of the drive wheel,
- the force transmission element (20) acting on the external tooth system of the drive wheel upon activation of the drive means so as to rotate the drive wheel (14).

10. The belt tensioner according to claim 9, wherein the force transmission element (20) is formed of a solid substantially deformable material.

11. The belt tensioner according to claim 10, wherein the force transmission element (20) is formed in one piece.

12. The belt tensioner according to any one of the claim 9, wherein the drive wheel (14) is arranged so that the force transmission element (20) drives the drive wheel (14) in a second circumferential direction (C) opposite to the first circumferential direction (B).

13. The drive wheel according to claim 9, wherein the teeth have at least one end face facing away from the central axis of the drive wheel and being inclined in the first circumferential direction.

14. The drive wheel according to claim 9, wherein clearances between neighboring teeth are not symmetrical with respect to planes defined by radial and axial directions.

* * * * *